(12) United States Patent  
Ferlitsch et al.

(10) Patent No.: US 8,379,243 B2
(45) Date of Patent: Feb. 19, 2013

(54) SYSTEMS AND METHODS FOR DEFERMENT OF A PRINT JOB WHEN THE PAPER SUPPLY IS INSUFFICIENT

(75) Inventors: Andrew R. Ferlitsch, Camas, WA (US); William J. Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1166 days.

(21) Appl. No.: 11/537,394

(22) Filed: Sep. 29, 2006

(65) Prior Publication Data

US 2008/0080003 A1  Apr. 3, 2008

(51) Int. Cl.
*G06F 3/12* (2006.01)
*G06K 15/00* (2006.01)

(52) U.S. Cl. ............ 358/1.15; 358/1.16; 358/1.13
(58) Field of Classification Search ......... 358/1.13–1.18
See application file for complete search history.

(56) References Cited

U.S. PATENT DOCUMENTS

| 6,064,838 | A | 5/2000 | Maruta et al. |
| 6,275,664 | B1 | 8/2001 | Wolf et al. |
| 6,348,971 | B2 * | 2/2002 | Owa et al. ............. 358/1.15 |
| 6,351,315 | B2 | 2/2002 | Kusumoto |
| 6,700,678 | B1 | 3/2004 | Luman |
| 6,752,548 | B2 | 6/2004 | Azami |
| 6,809,831 | B1 | 10/2004 | Minari |
| 7,769,636 | B1 * | 8/2010 | Kamiya ............. 705/26.1 |
| 2002/0099884 | A1 * | 7/2002 | Chang et al. ........... 710/62 |
| 2002/0171864 | A1 * | 11/2002 | Sesek ................. 358/1.15 |
| 2003/0053810 | A1 | 3/2003 | Jackelen et al. |
| 2003/0137693 | A1 * | 7/2003 | Nishio ................ 358/1.15 |
| 2005/0278421 | A1 | 12/2005 | Simpson et al. .......... 709/203 |
| 2006/0133832 | A1 * | 6/2006 | Watanabe et al. ........ 399/27 |
| 2006/0290948 | A1 * | 12/2006 | Ferlitsch ............... 358/1.1 |
| 2007/0013959 | A1 * | 1/2007 | Miwa ................. 358/304 |
| 2007/0046995 | A1 * | 3/2007 | Toda ................. 358/1.16 |

FOREIGN PATENT DOCUMENTS

| JP | 06-087548 | 3/1994 |
| JP | 09/254485 | 9/1997 |
| JP | 11/085415 | 3/1999 |
| JP | 2004216778 | 8/2004 |
| JP | 2005-335228 | 12/2005 |

OTHER PUBLICATIONS

"PrintLog Accounting Server, Version 2.5.4, Getting Started Guide," http://download.metrics.com/product/pas/63636/PAS254-GettingStarted.pdf, pp. 1-186.

* cited by examiner

*Primary Examiner* — Dov Popovici
(74) *Attorney, Agent, or Firm* — Austin Rapp & Hardman

(57) ABSTRACT

A method for deferring a print job within a queue is disclosed. The print job is received. The print job is scheduled for despooling to a printing device. Print data and print settings associated with the print job are analyzed. Paper requirements of the print job are determined. Availability of a paper supply associated with the printing device is determined. The print job is deferred if the paper supply does not satisfy the paper requirements.

19 Claims, 13 Drawing Sheets

SYSTEMS AND METHODS FOR DEFERMENT OF A PRINT JOB WHEN THE PAPER SUPPLY IS INSUFFICIENT

TECHNICAL FIELD

The present invention relates generally to computers and computer-related technology. More specifically, the present invention relates to systems and methods for deferment of a print job when the paper supply is insufficient.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

When a document is desired to be printed, the document is typically converted into a different format before it is sent to the printer. Additionally, each document sent to the printer may require different types, sizes, quantity, etc. of paper in order to be printed. If the printer does not include the required type, size or quantity of paper, the document may be halted from being sent to the printer. In turn, each document queued to be printed will also be halted. Benefits may be realized by providing systems and methods that enable deferment of a print job when the paper supply is insufficient.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
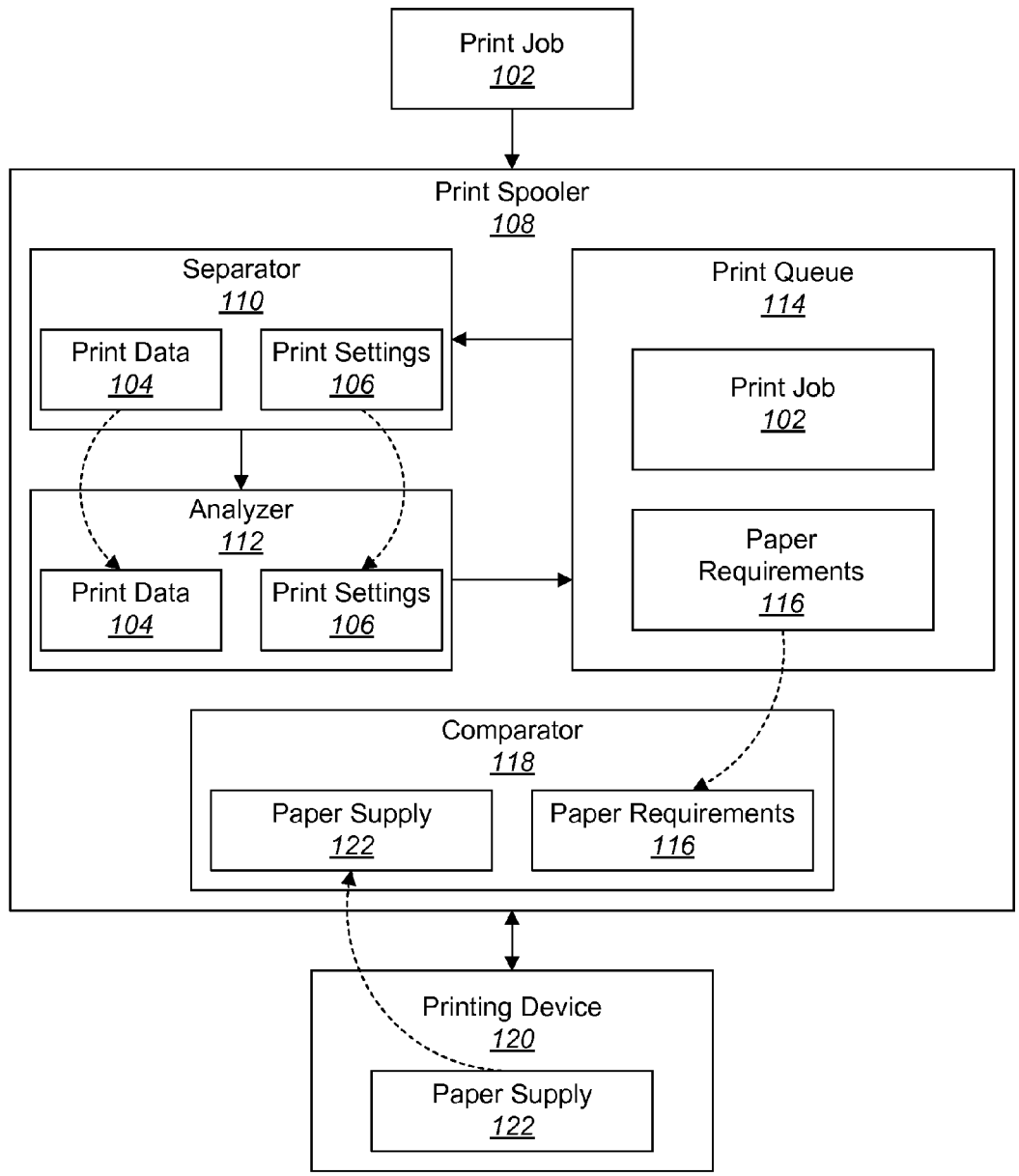
FIG. 1 is a block diagram illustrating one embodiment of a print spooler.

A method for deferring a print job within a queue is disclosed. The print job is received. The print job is scheduled for despooling to a printing device. Print data and print settings associated with the print job are analyzed. Paper requirements of the print job are determined. Availability of a paper supply associated with the printing device is determined. The print job is deferred.

In one embodiment, the deferring of the print job is performed by a print spooler. The print spooler may be external to the printing device. In another embodiment, the print spooler is internal to the printing device. In one embodiment, the print data is in a printer specific format. In another embodiment, the print data is in a non-printer specific format.

In one embodiment, a low parse analysis of the print data and the print settings is performed to determine the paper requirements. A notification that the print job was deferred may be sent. The availability of the paper supply associated with the printing device may be monitored. In one embodiment, the print job is recalled after deferment. The print job may be recalled if it is determined the paper supply associated with the printing device satisfies the paper requirements. In a further embodiment, the print data is rasterized before determining the availability of the paper supply associated with the printing device.

A computer device that is configured to defer a print job within a queue is also disclosed. The computer device includes a processor and memory in electronic communication with the processor. Instructions are stored in the memory. The print job is received. The print job is scheduled for despooling to a printing device. Print data and print settings associated with the print job are analyzed. Paper requirements of the print job are determined. Availability of a paper supply associated with the printing device is determined. The print job is deferred.

A printing device that is configured to defer a print job within a queue is also disclosed. The printing device includes a processor and memory in electronic communication with the processor. Instructions are stored in the memory. The print job is received. The print job is scheduled for despooling to the printing device. Print data and print settings associated with the print job are analyzed. Paper requirements of the print job are determined. Availability of a paper supply associated with the printing device is determined. The print job is deferred.

A computer-readable medium comprising executable instructions for implementing a method for deferring a print job within a queue is also disclosed. The print job is received. The print job is scheduled for despooling to a printing device. Print data and print settings associated with the print job are analyzed. Paper requirements of the print job are determined. Availability of a paper supply associated with the printing device is determined. The print job is deferred.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

When multiple jobs are queued in a print queue for despooling to a printer, the jobs are typically despooled in the order they were placed in a print queue. In a traditional print spooler, such as the Microsoft print spooler, if a problem occurs with a print job, the print spooler may halt despooling of any subsequent jobs until the problem is resolved.

A print job may require a paper size that is currently not loaded or in sufficient supply in a printing device, while the paper requirements of subsequent jobs may be loaded and in sufficient quantity in the printing device. In a traditional print spooler, once the printer has received and started to process the job, the printer may halt until the correct paper is loaded into the printing device. During this halt time, the subsequent jobs are held up in the print queue and are not processed by the printing device.

FIG. 1 is a block diagram illustrating one embodiment of a print spooler 108. The print spooler 108 may facilitate spooling a print job 102 to a print queue 114 and despooling the print job 102 to a printing device 120. The printing device 120 may include a computer printer, a facsimile device, a copy device, a plotting device, and the like. In one embodiment, the print job 102 is a file or set of files that are submitted to the printing device 120 to be outputted. The print job 102 may also include various data types of varying formats.

The format of a particular data type may be modified to yield print data 104. The print job 102 may be associated with the print data 104 and print settings 106. In one embodiment, the print data 104 may include a printer specific format (e.g., generated by a printer driver). In another embodiment, the print data 104 may include a documentation application specific format (e.g., direct print). The print settings 106 may include information regarding how to render and output the print job 102.

In one embodiment, the print spooler 108 may receive the print job 102. In one embodiment, the print job 102 may be spooled in the print queue 114. The print queue 114 may include a buffer where various entities such as data, objects, events, etc. are stored and wait to be processed. The print spooler 108 may also include a separator 110. The separator 110 may separate the print data 104 and the print settings 106 associated with the print job 102. The print data 104 and the print settings 106 may each be communicated to an analyzer 112. In one embodiment, the analyzer 112 may analyze the print data 104 and the print settings 106 and determine paper requirements 116. The paper requirements 116 may indicate the quantity, type, size, etc. of paper required to successfully output the print job 102. The paper requirements 116 may be stored in the print queue 114 with the associated print job 102.

The print spooler 108 may also include a comparator 118. The comparator 118 may compare the paper requirements 116 associated with the print job 102 with a paper supply 122 associated with the printing device 120. The paper supply 122 may include the quantity, type, size, etc. of paper available to the printing device 120. In one embodiment, the comparator 118 accesses the paper requirements 116 stored in the print queue 114. The comparator 118 may also receive the paper supply 122 associated with the printing device 120. In one embodiment, the comparator 118 may query the printing device 120 for the paper supply 122. In a further embodiment, the comparator 118 may continually monitor the status of the paper supply 122 of the printing device 120. The comparator 118 may determine if the paper supply 122 of the printing device 120 satisfies the paper requirements 116 associated with the print job 102.

Figure 2:
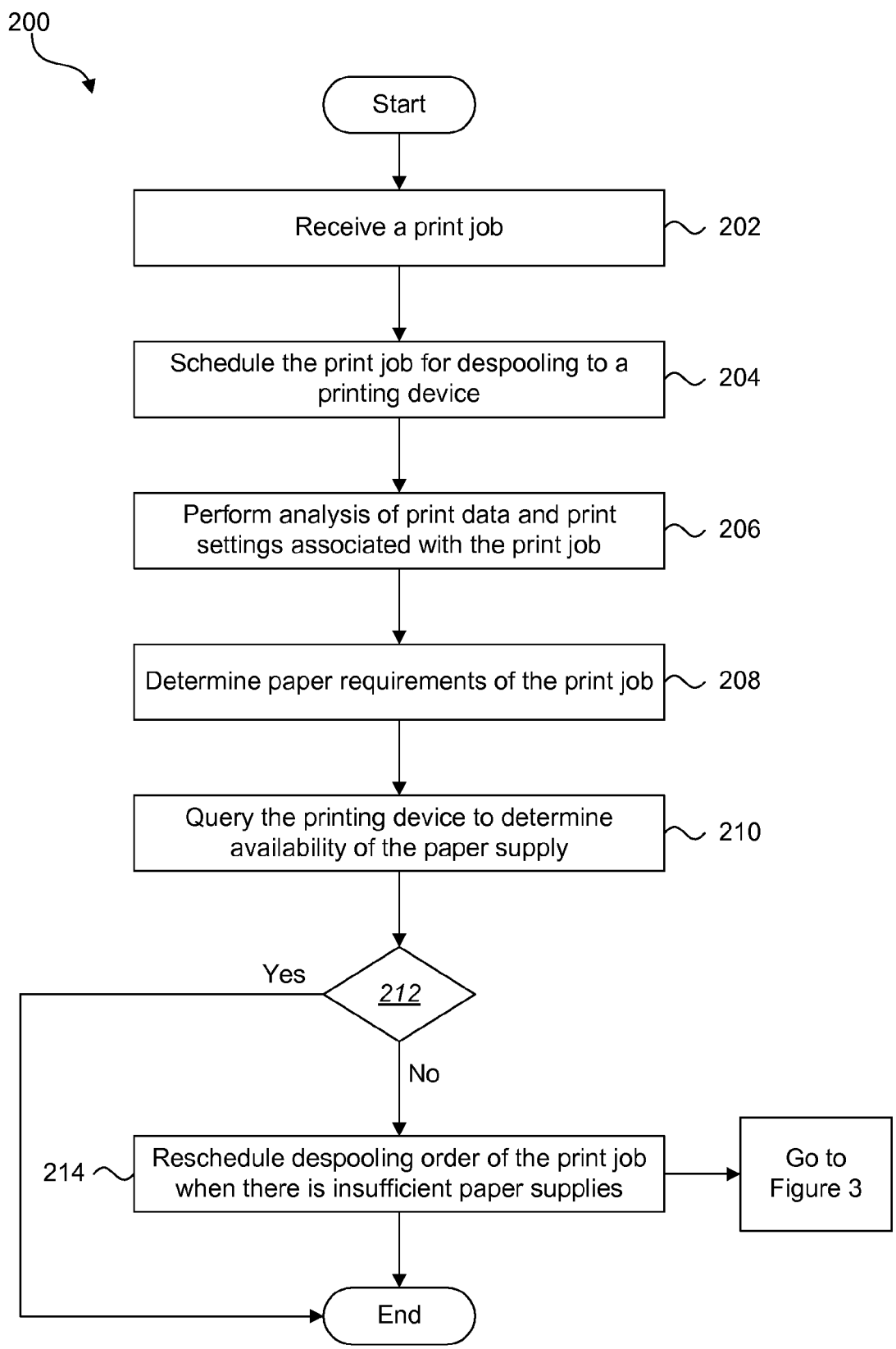
FIG. 2 is a flow diagram illustrating one embodiment of a method to determine whether a printing device includes a sufficient paper supply.

FIG. 2 is a flow diagram illustrating one embodiment of a method 200 to determine whether the printing device 120 includes a sufficient paper supply 122. In one embodiment, the method 200 may be implemented by the print spooler 108. The print job 102 may be received 202. In one embodiment, the print job 102 may be scheduled 204 for despooling to the printing device 120. The print job 102 may be stored in the print queue 114.

An analysis of the print data 104 and print settings 106 associated with the print job 102 is performed 206. In one embodiment, the analysis is performed 206 by the analyzer 112. The analysis of the print data 104 and the print settings 106 may facilitate determining 208 the paper requirements 116 associated with the print job 102.

In one embodiment, the print spooler 108 queries 210 the printing device 120 to determine the availability of the paper supply 122 associated with the printing device 120. If the print spooler 108 determines 212 that the printing device 120 includes a sufficient paper supply 122 the method 200 ends. However, if the print spooler 108 determines 212 that the printing device 120 does not include a sufficient paper supply 122, the print spooler 108 may reschedule 214 the despooling order of the print job 102. For example, if the print spooler 108 determines 212 that the printing device 120 does not include a sufficient paper supply 122 to satisfy the paper requirements 116 associated with the print job 102, the print spooler 108 may defer 214 when the print job 102 is to be despooled to the printing device 120. After rescheduling 214 the print job 102, the method 200 may proceed to FIG. 3.

Figure 3:
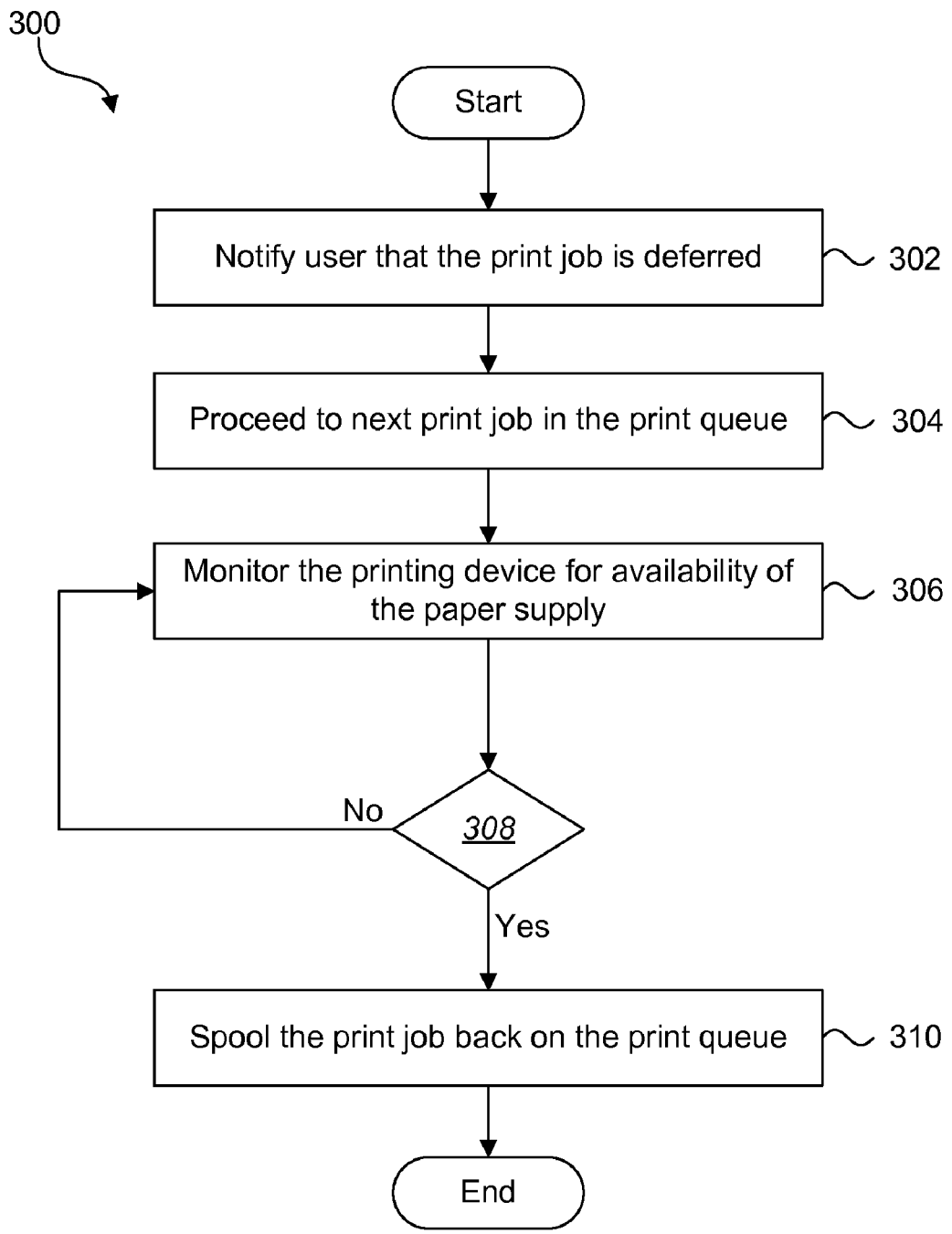
FIG. 3 is a flow diagram illustrating one embodiment of a method for monitoring the paper supply of the printing device.

FIG. 3 is a flow diagram illustrating a method 300 for monitoring the paper supply 122 of the printing device 120 after the rescheduling 214 of the print job 102. In one embodiment, the method 300 may be implemented by the print spooler 108. When the print job 102 is rescheduled 214 for despooling to the printing device 120 a user may be notified 302 that the print job 102 is deferred. The print spooler 108 may proceed 304 to despool a next print job in the print queue 114. For example, the print job 102 may be deferred by changing the location of the print job 102 in the printing queue 114. The print spooler 108 may despool the next print job located in the printing queue 114. In another embodiment, the print job 102 may be deferred by rescheduling the print job 102 on a print queue 114 for another printer that has sufficient paper supply (not shown).

In one embodiment, the printing device 120 is monitored 306 for the availability of the paper supply 122. In one embodiment, the comparator 118 monitors 306 the paper supply 122 of the printing device 120 while the print job 102 is deferred. The comparator 118 determines 308 if there is a sufficient paper supply 122 to satisfy the paper requirements 116 associated with the print job 102. If the comparator 118 determines 308 that the printing device 120 does not include a sufficient paper supply 122, the comparator 118 continues to monitor 306 the paper supply 122. If the comparator 118 determines 308 that the printing device 120 does include a sufficient paper supply 122, the print spooler 108 may spool 310 the print job 102 back on the print queue 114. The print job 102 may then be despooled to the printing device 120.

Figure 4:
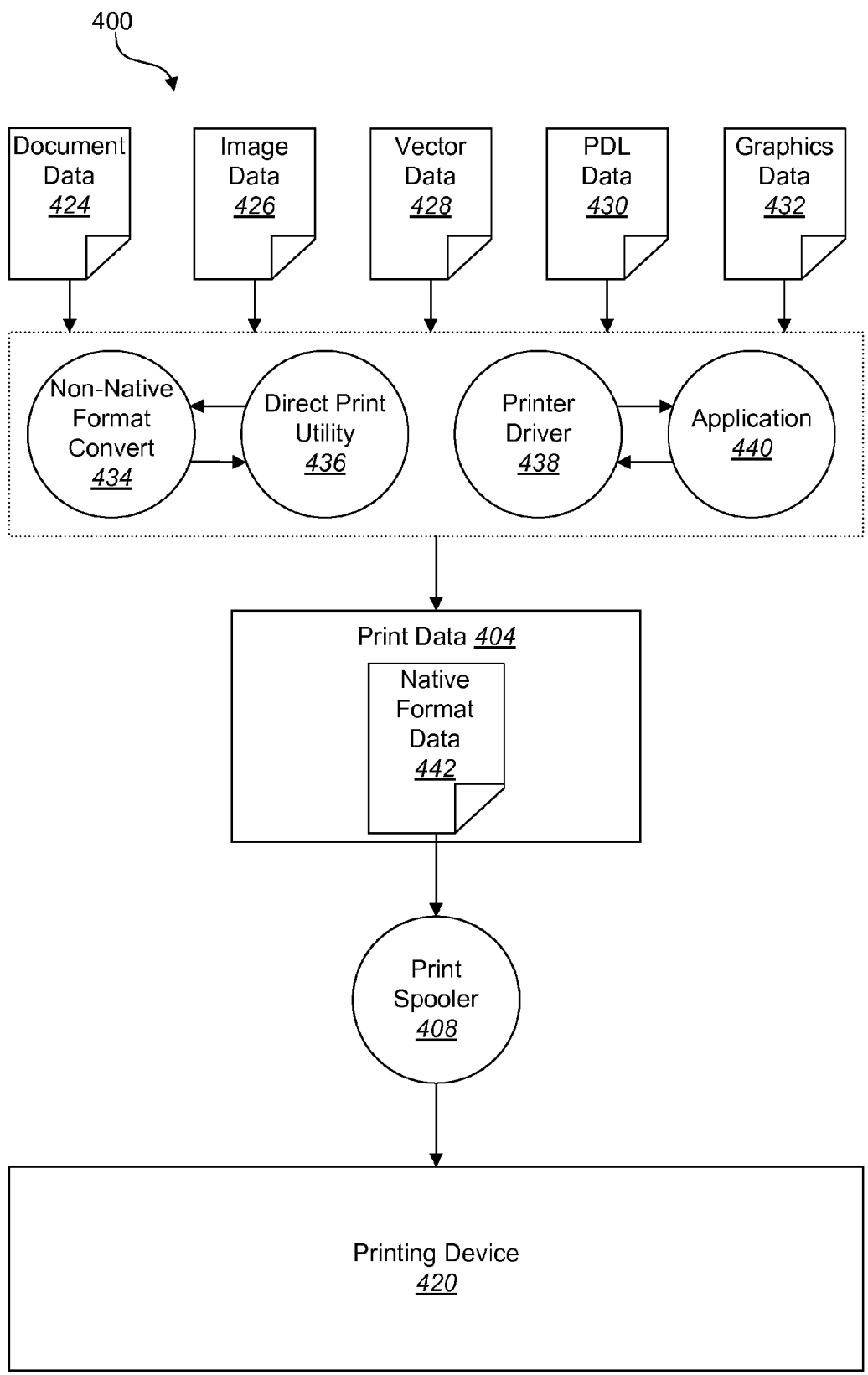
FIG. 4 is a block diagram illustrating a further embodiment of the print spooler receiving print data.

FIG. 4 is one embodiment of a block diagram 400 illustrating a further embodiment of the print spooler 408 receiving the print data 404. In one embodiment, the block diagram 400 may include one or more local, networked and/or remotely connected printing devices 420. The printing device 420 may be capable of rendering or outputting one or more classes of data formats. In one embodiment, the printing device 420 may render or output data formats without a printing driver 438.

Various forms of data may be modified and transmitted to the print spooler 408. The data may include document data 424, image data 426, vector data 428, page description language (PDL) data 430 and graphics data 432. In one embodiment, the document data 424 may include unformatted document formats such as plain-text or extensible markup language (XML). In another embodiment, the document data 424 may include formatted document formats such as portable document format (PDF) or rich text format (RTF). The image data 426 may include image formats such as tagged image file (TIFF), joint photographic experts group file interchange format (JPEG/JFIF), JPEG 2000, portable network graphics (PNG), graphics interchange format (GIF), exchangeable image file format (EXIF) and Windows Bitmap. The vector data 428 may also include vector formats including scalable vector graphics (SVG) and Hewlett-Packard graphics language (HP-GL/2). The PDL data 430 may further include PDL formats including printer command language (PCL), PCL XL, postscript and Epson standard code for printers (ESC/P). The graphics data 432 may also include various graphics formats including enhanced metafile (EMF) and Microsoft metro.

The various formats may be modified to print data 404 in order to be readable by the printing device 420. In one embodiment, the format may be modified by a printer driver 438. The printer driver 438 may modify a format of an application 440 and generate a printer specific format. For example, the application 440 may include one or more than one of the various data types previously listed. The various data types included in the application 440 may include formats that may not be readable by the printing device 420. The printer driver 438 may convert the data formats into a format specific to the printing device 420. In another embodiment, the various data types may include non-native formats that may be unreadable by the printing device 420. A converter 434 may convert the non-native formats using a direct print utility 436. The direct print utility 436 may facilitate the printing device 420 to render or output non-readable formats without the printer driver 438. In another embodiment, conversion of a non-native format to a native format may be deferred until after the print data 404 is despooled to the printing device 420. In this case, the printing device 420 may use an external conversion service or converter running as a guest application on a multi-functional printer (MFP) (not shown).

In a further embodiment, the print data 404 may be generated by the printer driver 438 from the application 440. The application 440 may convert a document into printing instructions, such as GDI (i.e., Graphics Device Interface) or extensible markup language paper specification (XPS) in the Microsoft family of operating systems. The printing instructions would then be passed to the printer driver 438 installed on the client and/or server associated with the printing device 420 in the form of specialized printing instructions that take into account the device capabilities. In the Microsoft family of operating systems, these specialized printing instructions are known as DDI (i.e., Device Driver Interface) instructions. The printer driver 438 would then convert the printing instructions into the print data 404 which may include a printer dependent format, such as a raster image, TIFF, PDF, or PDL (i.e., Page Description Language) such as PCLXL or Postscript. In other cases, such as Direct Printing, the document format may be directly interpreted by the printing device 420 and there is no preprocessing of the document format into a printer dependent format.

In a further embodiment, the print data 404 may include a native data format 442 which is readable by the printing device 420. The data native format 442 may have been generated by the printer driver 438 or it may have been provided by the direct print utility 436. The print data 404, including the data native format 442 may be received by the print spooler 408. The print spooler 408 may despool the print job associated with the print data 404 to the printing device 420 for rendering or outputting.

Figure 5:
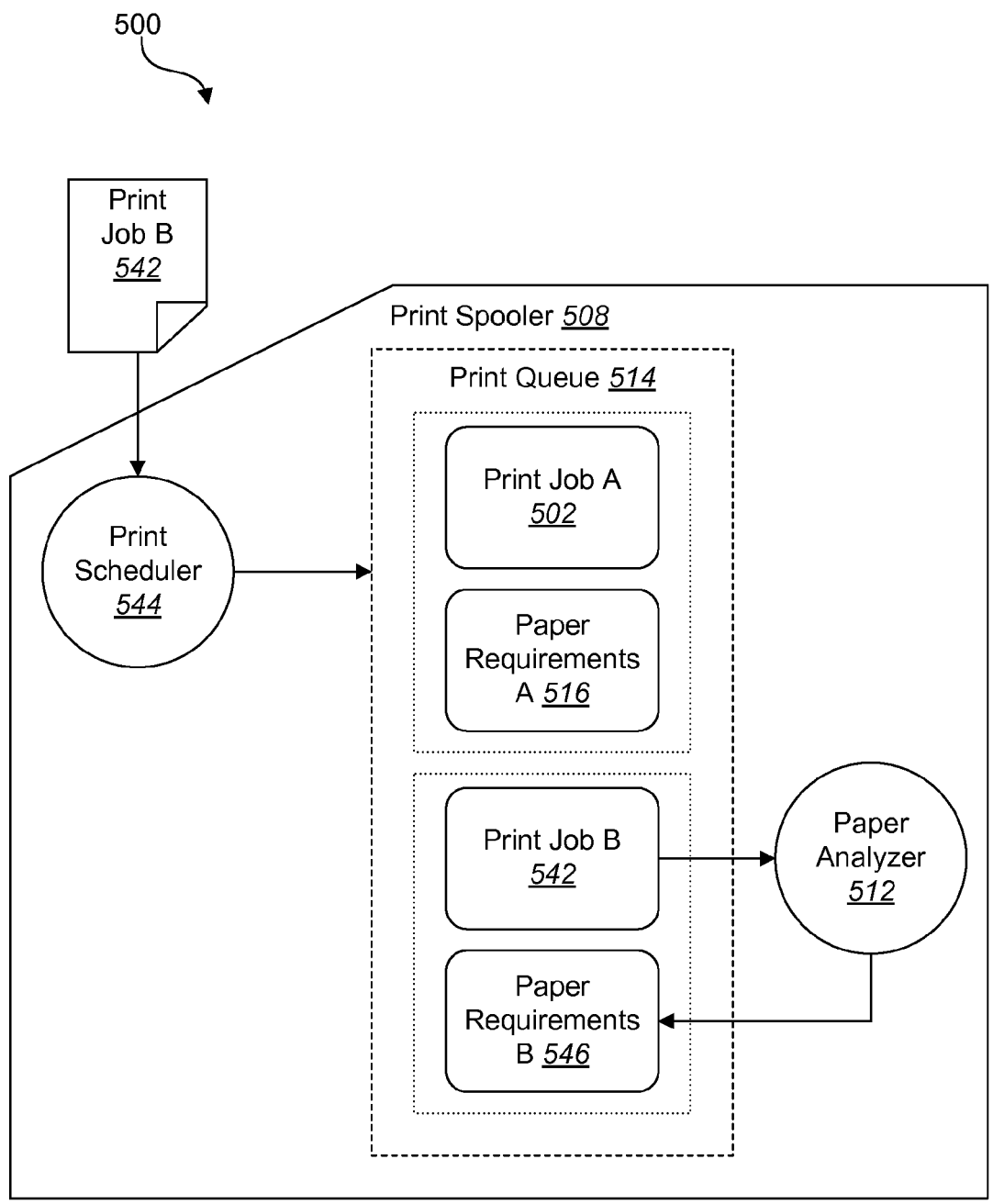
FIG. 5 is a block diagram illustrating one embodiment of a print job being scheduled for despooling.

FIG. 5 is a block diagram illustrating one embodiment of print job B 542 being scheduled by the print spooler 508. The print spooler 508 may receive print job B 542 and place print job B 542 on the print queue 514 for despooling to the printing device 120. In one embodiment, a print scheduler 544 places print job B 542 on the queue 514 according to a job scheduling algorithm. The job scheduling algorithm may be any algorithm with various parameters, such as first in first out (FIFO), job priorities, time of the day, etc. In one embodiment, the print scheduler 544 may place print job B 542 on the print queue 514 such that print job B 542 is despooled at a later time than print job A 502. Print job A 502 may be stored in the print queue 514 with associated paper requirements A 516.

In one embodiment, the print spooler 508 includes a paper analyzer 512. Prior to selecting print job B 542 for despooling to the printing device 120, the paper analyzer may analyze print job B 542 to determine paper requirements B 546 associated with print job B 542. In one embodiment, the analyzer 512 analyzes print job B 542 at the time print job B 542 is selected for despooling to the printing device 120. In a further embodiment, the analyzer 512 analyzes print job B 542 prior to despooling print job B 542. For example, a background thread may be used for analyzing print job B 542. Paper requirements B 546, determined by the analyzer 512, may be stored in the print queue 514 with print job B 542.

Figure 6:
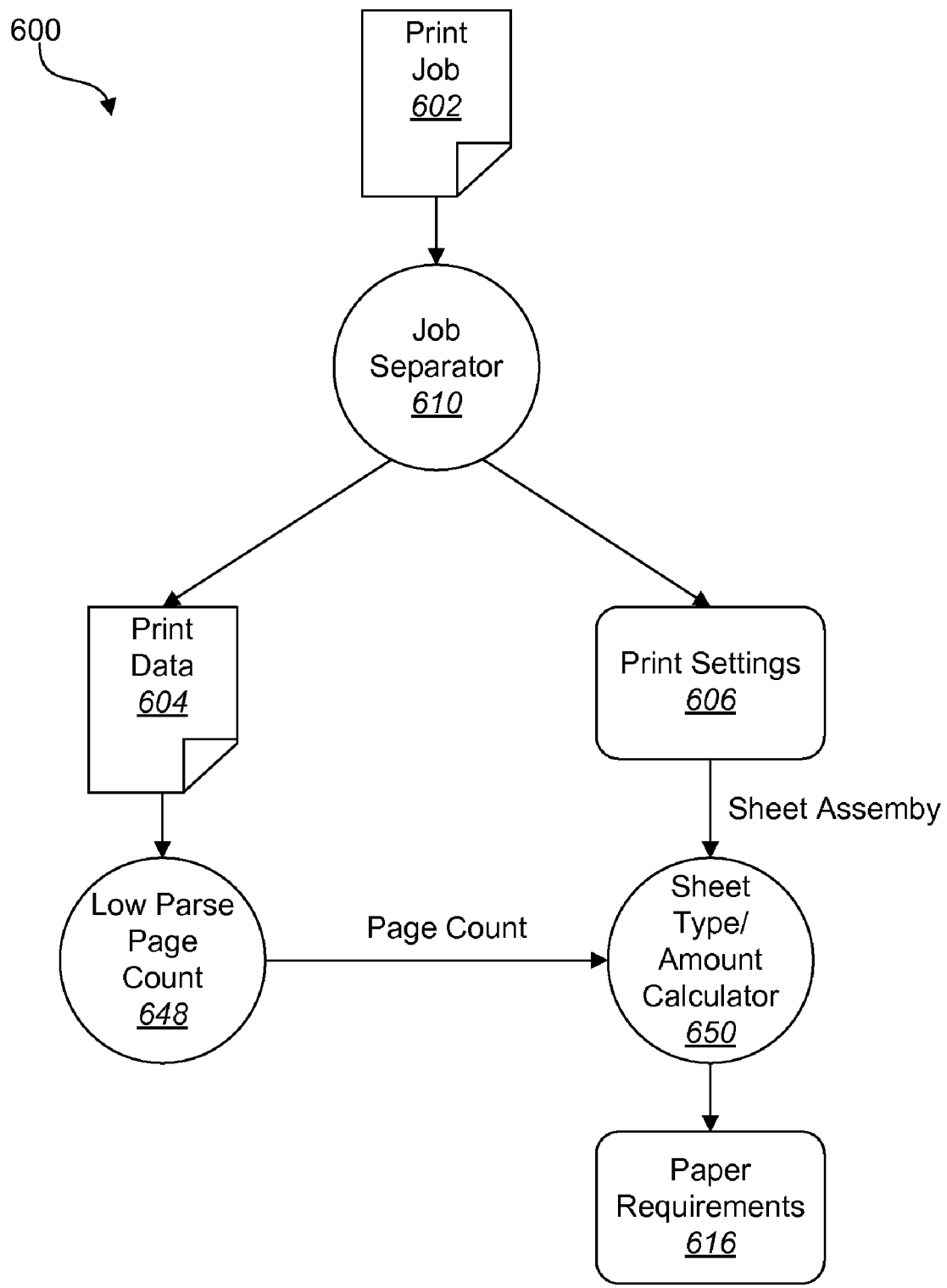
FIG. 6 is a block diagram illustrating one embodiment of the print spooler analyzing the print job.

FIG. 6 is a block diagram illustrating one embodiment 600 of analyzing the print job 602 in order to determine the paper requirements 616 associated with the print job 602. The print job 602 may include one of the various data types as previously mentioned. Further, as previously explained, the print job 602 may be associated with the print data 604 and the print settings 606. A job separator 610 may receive the print job 602 and separate the print data 604 from the print settings 606. In one embodiment, the analyzer 112 may attempt to classify the data type as being one of the following types: unformatted document data, formatted document data, image data, vector data, page description language or graphics language. The analyzer 112 may also use any method to determine the data format classification of the data type. For example, certain data format types may have unique signatures, which uniquely identify the data format type. The following table may illustrate examples of unique signatures associated with certain data format types.

TABLE 1

| Data Format Type | Signature |
|---|---|
| PDF | %PDF |
| RTF | {/rtf1/ansi |

TABLE 1-continued

| Data Format Type | Signature |
|---|---|
| PJL | @PJL |
| PS | %!PS |
| PCL | <ESC>E |
| PCL XL | ) HP-PCL XL; |
| TIFF | \|\|*<NUL> or MM<NUL>* |
| JPEG | 0xFF 0xD8 0xFF 0xEE |
| JPEG 2000 | 0xFF 0x4F |
| PNG | 0x89PNG |
| GIF | GIF87a or GIF89a |
| Windows Bitmap | BM |
| SVG | <svg |

In a further embodiment, other data format types may be determined by the presence or absence of sequences, which may be used as a deterministic indicator. The analyzer 112 may determine the data format type and then analyze the print data 604 to determine the number of logical pages associated with the print job 602. In one embodiment, the number of logical pages is determined by using a format class specific low parse page count method 648. The low parse method may be a method that may efficiently and reliably parse the print data 604 to determine the total number of pages required by the print job 602 without parsing or interpreting the entire data.

Additionally, the print settings 606 associated with the data type are separated from the print data 604. In one embodiment, a job separator 610 performs the separation. The analyzer 112 may analyze the print settings 606 for settings that may affect the number of sheets that may be outputted. The print settings 606 may include copy collation that indicates the number of copies of the print job 602 to be outputted, sheet assembly (for example duplex, booklet, N-up and front/back covers) and paper (size, type, trays, etc.) The analyzer 112 may then apply these print settings 606 and the number of logical pages determined from the print data 604 to an amount calculator 650. The amount calculator 650 may calculate the total number, size and type of physical sheets that may be outputted from the print job 602. The amount calculator 650 may also determine from which paper trays the physical sheet will be fed from.

Figure 7:
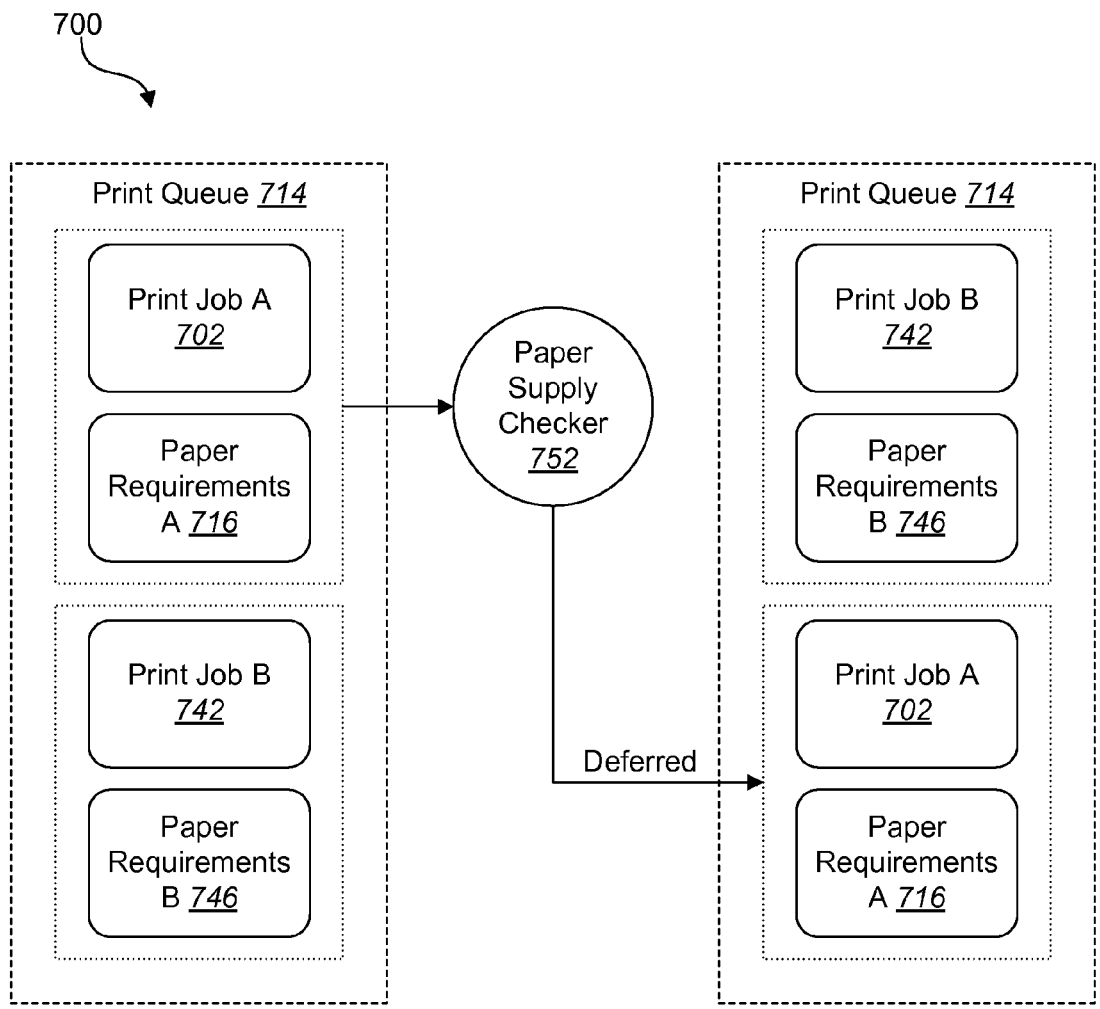
FIG. 7 is a block diagram illustrating one embodiment of a paper supply checker deferring a print job.

FIG. 7 is a block diagram 700 illustrating one embodiment of a paper supply checker 752 deferring print job A 702. In one embodiment, when print job A 702 is selected for despooling to the printing device 120, the print spooler 108 may dynamically check the paper supply 122 of the printing device 120. The paper supply 122 may be compared to paper requirements A 716 associated with print job A 702. In one embodiment the paper supply checker 752 may perform the comparison of the paper supply 122 and paper requirements A 716. The print spooler 108 may obtain the information pertaining to the paper supply 122 by any means, such as querying the printing device 120 for its paper supply 122. This may be executed by implementing simple network management protocol (SNMP) or printer job language information (PJL INFO). The print spooler 108 may also obtain the paper supply 122 information through a manual input by an operator of the printing device 120. The paper supply 122 may further be obtained through an event, such as the printer device 120 notifying the print spooler 108 when there is a change in the paper supply 122.

In one embodiment, the granularity of the paper supply 122 may be any that is supported by the printing device 120. For example, the granularity may include empty/non-empty, coarse (such as estimated based on weight or height of the paper in the input tray) and precise (such as by pre-knowing the exact amount of paper loaded in a tray and subtracting from the total number of paper as sheets are consumed).

If the paper supply checker 752 determines that the paper supply 122 is insufficient for print job A 702, the print spooler 108 may defer print job A 702. The print spooler 108 may also notify a user that print job A 702 is deferred. The print spooler 108 may defer print job A 702 by any means, such as moving print job A 702 one slot down in the print queue 714, moving print job A 702 to a separate deferment queue (not shown), moving print job A 702 to the end of the print queue 702, and moving print job A 702 to a separate print queue for another printing device that has sufficient paper supply (not shown).

Figure 8:
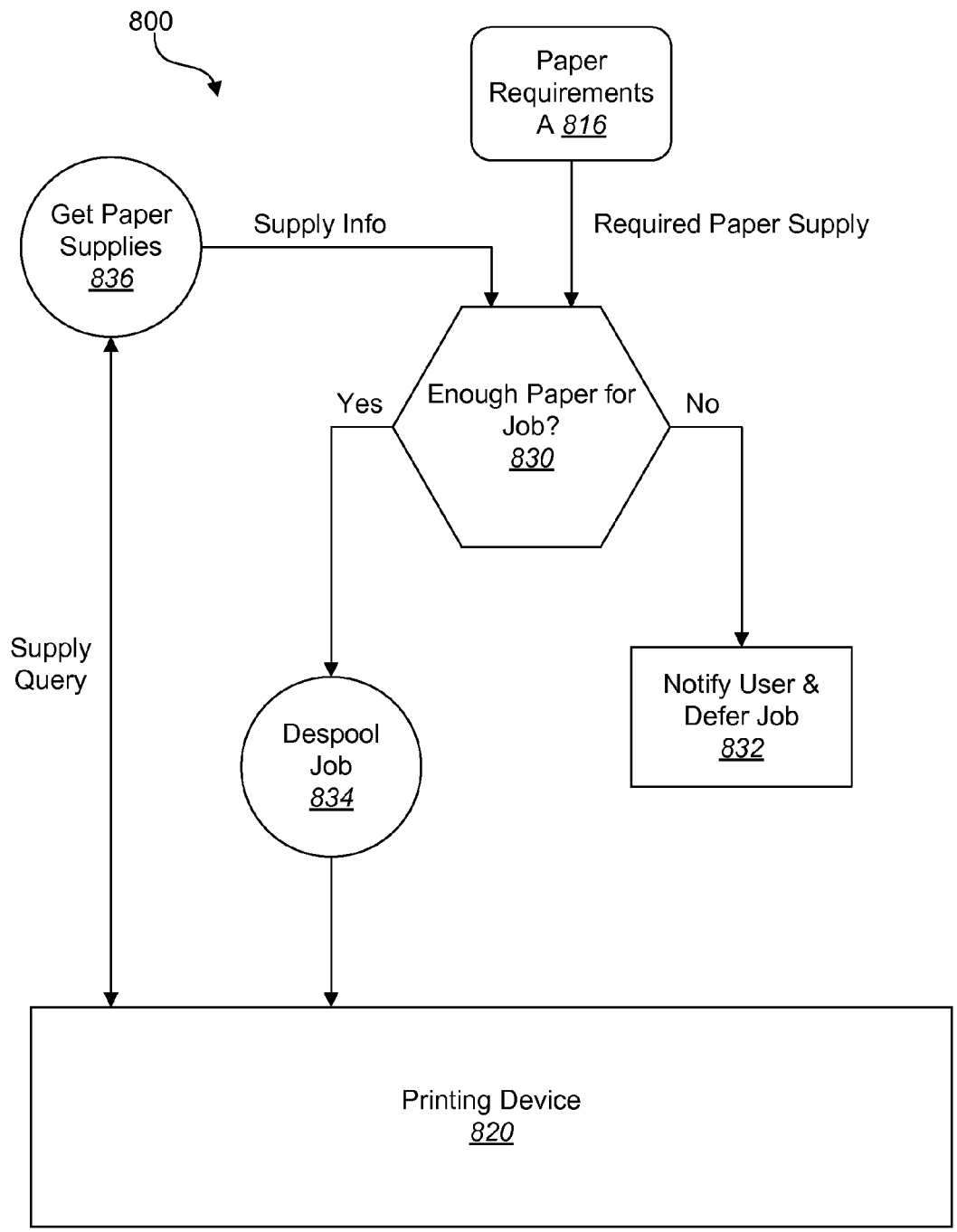
FIG. 8 is a flow diagram illustrating one embodiment of a method of deferring the print job.

FIG. 8 is a flow diagram illustrating one embodiment of a method 800 of deferring print job A 702. The method 800 may be used in conjunction with the block diagram 700 illustrated in FIG. 7. The paper supply checker 752 may determine 830 if there is sufficient paper supplies 122 for print job A 702. The paper supply checker 752 may compare paper requirements A 816 with the paper supply 122 of the printing device 820. If there are not enough paper supplies 122, a user is notified 832 and print job A 702 is deferred 832. If there are sufficient paper supplies 122, print job A 702 is despooled 834 to the printing device 820. In one embodiment, a monitor (such as the comparator 118) may continually retrieve 836 information regarding the paper supply 122 of the printing device 820. The monitor may supply a query to the printing device 820 to obtain the information. The monitor may provide the paper supply 122 information to the paper supply checker 752 when the checker 752 determines 830 if there is a sufficient paper supply 122 for paper requirements A 816.

Figure 9:
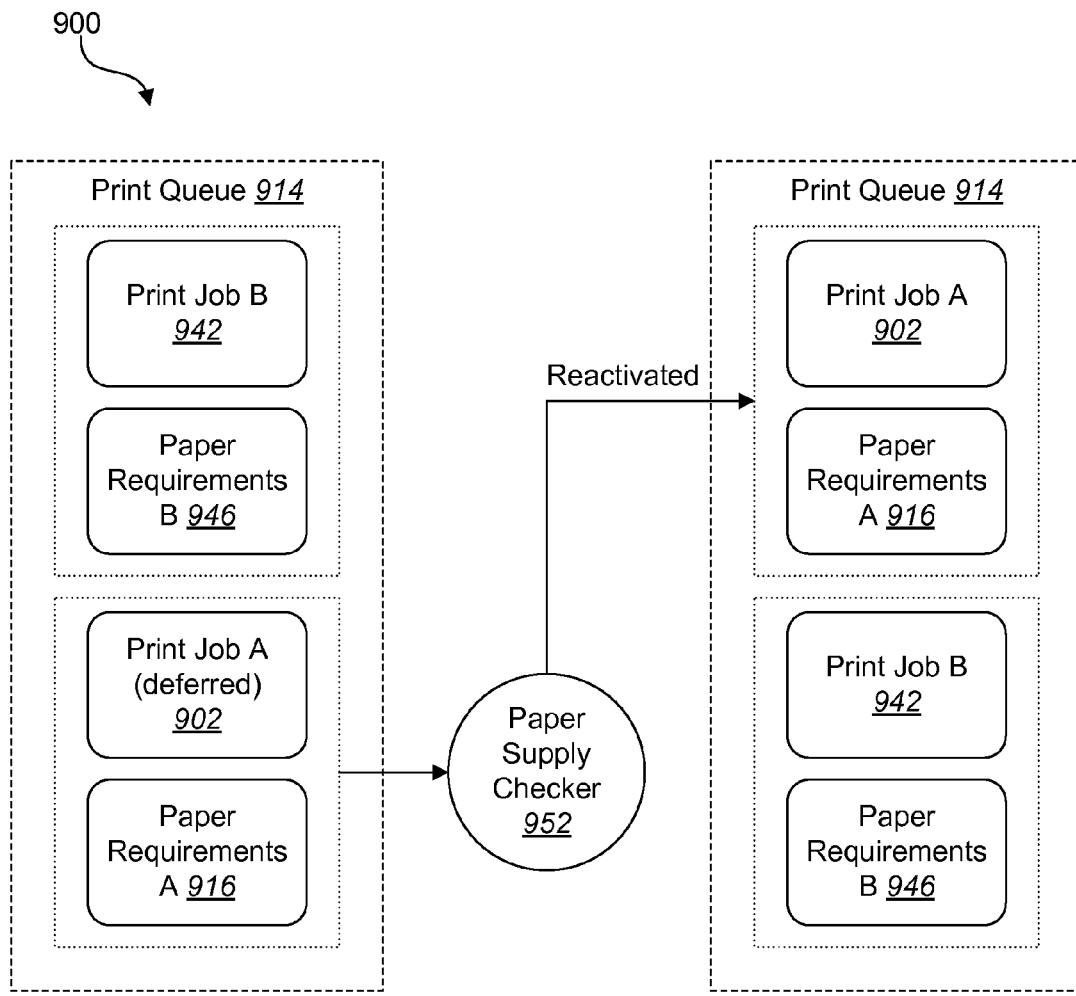
FIG. 9 is a block diagram illustrating one embodiment of the print spooler reactivating the print job.

FIG. 9 is a block diagram illustrating one embodiment 900 of reactivating print job A 902. For example, after print job A 902 is deferred as explained in FIG. 7, paper requirements A 916 may be periodically compared with the current paper supplies 122 of the printing device 120. In one embodiment, the comparison is periodically performed to determine if there are sufficient paper supplies 122 to reactivate print job A 902.

The monitoring of the current paper supplies 122 may be performed, as explained in FIG. 8, by the comparator 118. The comparator 118 may also include the paper supply checker 952. The monitoring may occur at any point, such as prior to the despooling of the next print job, for example print job B 942. In a further embodiment, the monitoring may occur on a periodic basis using a background process. In an additional embodiment, the printing device 120 may provide updates to the changes in its paper supply 122. Alternatively, a user may manually provide information regarding the paper supply 122 of the printing device 120 to the comparator 118.

In one embodiment, the print spooler 108 may determine that the paper supply 122 of the device 120 is now sufficient to process print job A 902. As such, print job A 902 may be reactivated (i.e., un-deferred). Print job A 902 may be reactivated by any means, such as immediate despooling of print job A 902 from the print queue 914 to the printing device 120. In a further embodiment, print job A 902 may be reactivated by placing it as the next (after the current) job in the print queue 914 for despooling to the printing device 120.

In an alternative embodiment, the print spooler 108 may be embedded within the printing device 120. The methods 200, 300, 600, 800 and 900 may be implemented within the printing device 120. In one embodiment, it the print spooler 108 determines that the printing device 120 does not have a sufficient paper supply 122 to process the print job 102, the print job 102 may be deferred and stored in a filing storage device within the printing device 120. The methods implemented within the printing device 120 may be executed before the print job 102 is rasterized by a raster image processor (RIP).

Figure 10:
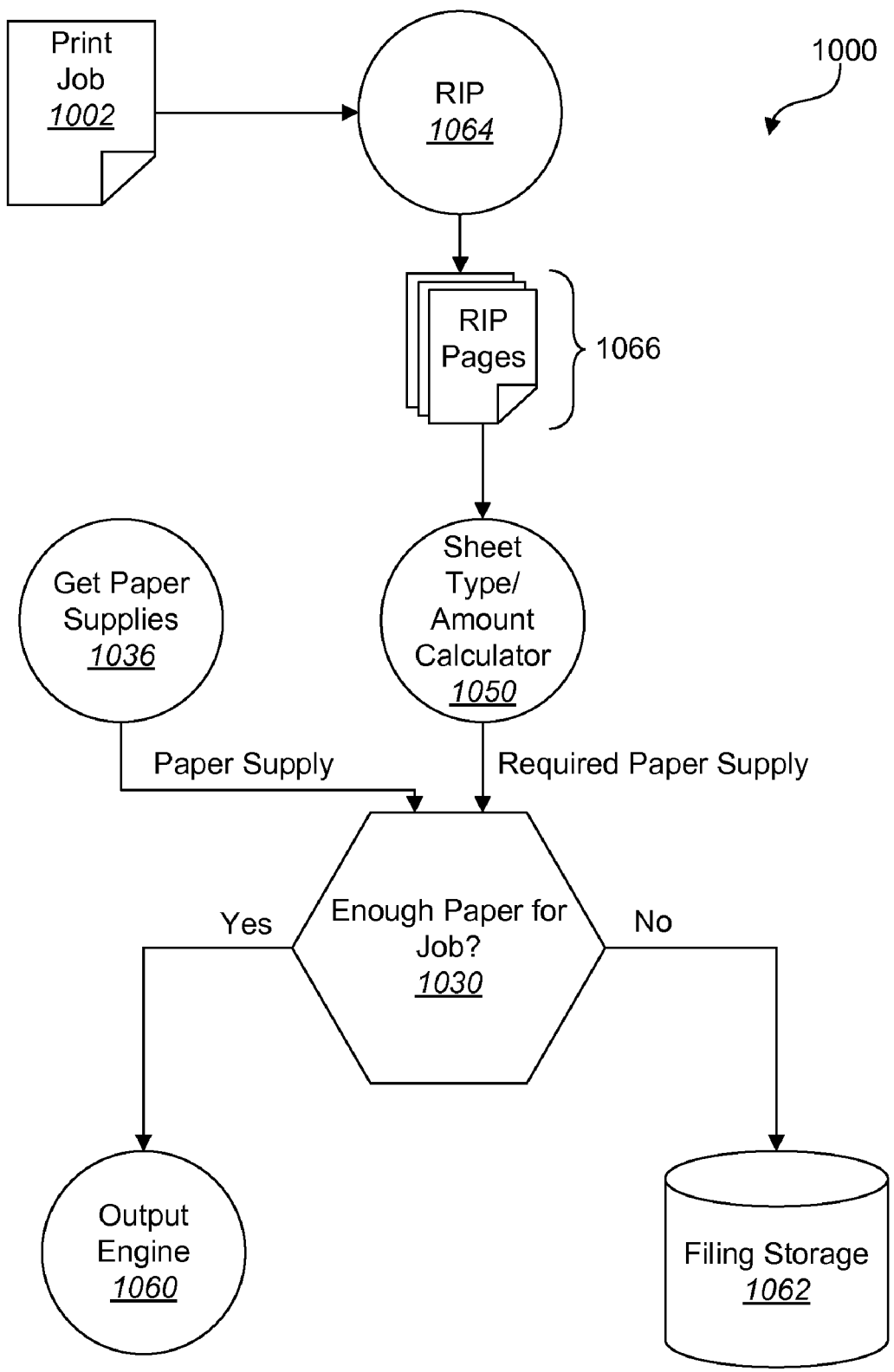
FIG. 10 is a flow diagram illustrating one embodiment of a method for scheduling the print job after rasterization of the print job.

FIG. 10 is a flow diagram illustrating one embodiment of a method 1000 for scheduling the print job 1002 after the print job 1002 has been rasterized by a raster image processor (RIP) 1064. The RIP 1064 may be a component used in the printing device 120 to produce a bitmap. The bitmap may then be used by the printing device 120 to output the print job 1002. The rasterized print job 1002 may be spooled by the print spooler 108 which may be internal to the printing device 120.

The RIP 1064 may rasterize the print job 1002 and produce a plurality of RIP pages 1066. The pages 1066 may include the bitmaps used by the printing device 120 to output the print job 1002. In one embodiment, the internal print spooler 108 calculates 1050 the paper requirements 116 associated with the RIP pages 1066 from the print job 1002. The print spooler 108 determines 1030 if the printing device 120 has sufficient paper supplies 122 to output the rasterized print job 1002. If the print spooler 108 determines 1030 that there is not sufficient paper supplies 122, the rasterized pages 1066 are sent to a filing storage 1062. The filing storage may 1062 may be internal or external to the printing device 120. For example, the printing device 120 may file deferred raster pages 1066 to a removable storage device (e.g., universal serial bus (USB) thumbdrive). The printing device 120 may notify the user that the rasterized pages 1066 associated with the print job 1002 have been deferred. In one embodiment, the printing device 120 may proceed to rasterize or output the next print job.

If the print spooler 108 determines 1030 that there are sufficient paper supplies 122 to output the rasterized pages 1066, the pages 1066 are sent to an output engine 1060 of the printing device 120. The output engine facilitates outputting the rasterized data, such as the rasterized pages 1066. In one embodiment, the internal print spooler 108 monitors the paper supply 122 of the printing device 120. The internal print spooler 108 may send a query to get 1036 information regarding the current status of paper supplies 122 within the printing device. The print spooler 108 may use the current paper supply information when determining 1030 whether or not the printing device 120 has enough paper supplies 122 to output the rasterized print job 102.

Figure 11:
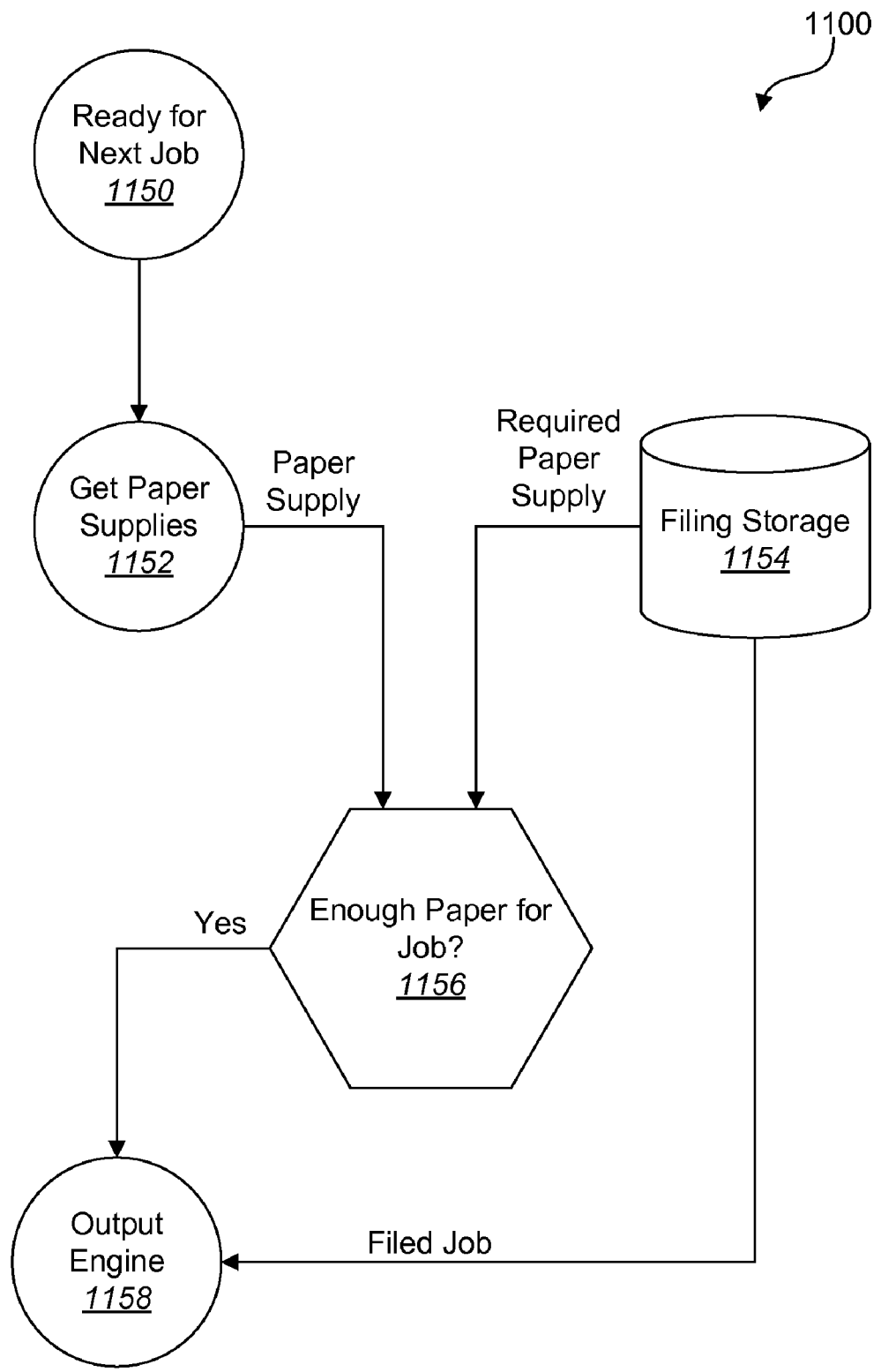
FIG. 11 is a flow diagram illustrating one embodiment of a method to recall the print job from a filing storage of a printing device.

FIG. 11 is a flow diagram illustrating one embodiment of a method 1100 to recall the print job 102 from the filing storage 1154 when the printing device 120 has sufficient paper supplies 122. In one embodiment, the method 1100 is implemented by the print spooler 108 which may be internal to the printing device 120. When the print spooler 108 is ready 1150 to despool the next print job, the spooler 108 may get 1152 the current status of the paper supplies 122 of the device 120. The current paper supply 122 information is then used by the print spooler 108 to compare against the paper requirements 116 of a rasterized print job 102 which may have been previously deferred to the filing storage 1154 of the printing device 120. If the print spooler 108 determines 1156 that there is enough paper for the print job 102, the job 102 is recalled from the filing storage 1154 and queued for outputting to the output engine 1158.

In other embodiments, the printing operations of the printing device 120 may also include any type of imaging operations, which may require a consumable to output, such as copy, inbound fax, etc. The print spooler 108 may run on any operating system, such as the Microsoft Windows family of operating systems, the Apple Macintosh Operating System, Linux Operating System, System V Unix Operating Systems, Berkeley Software Distribution (BSD) Unix Operating Systems, Open Software Foundation (OSF) Unix Operating Systems, Sun Solaris Operating Systems, Hewlett Packard Unix (HP/UX) Operating Systems, and International Business Machines (IBM) Mainframe Multiple Virtual Storage (MVS) Operating System, and the like.

While the disclosed embodiments were described as determining the paper requirements 116 and comparing them with the paper supply 122, in other embodiments, the paper requirements 116 and the paper supply 122 may be any type of consumable, such as toner/ink, staples, etc. In light of the definition of a paper requirement 116 and paper supply 122 above, the term paper, as used herein, is broadly defined as physical hardcopy sheets of cut paper, uncut paper (i.e., continuous roll), fabric, foil, toner/ink, staples, stamps, and binding clips.

Figure 12:
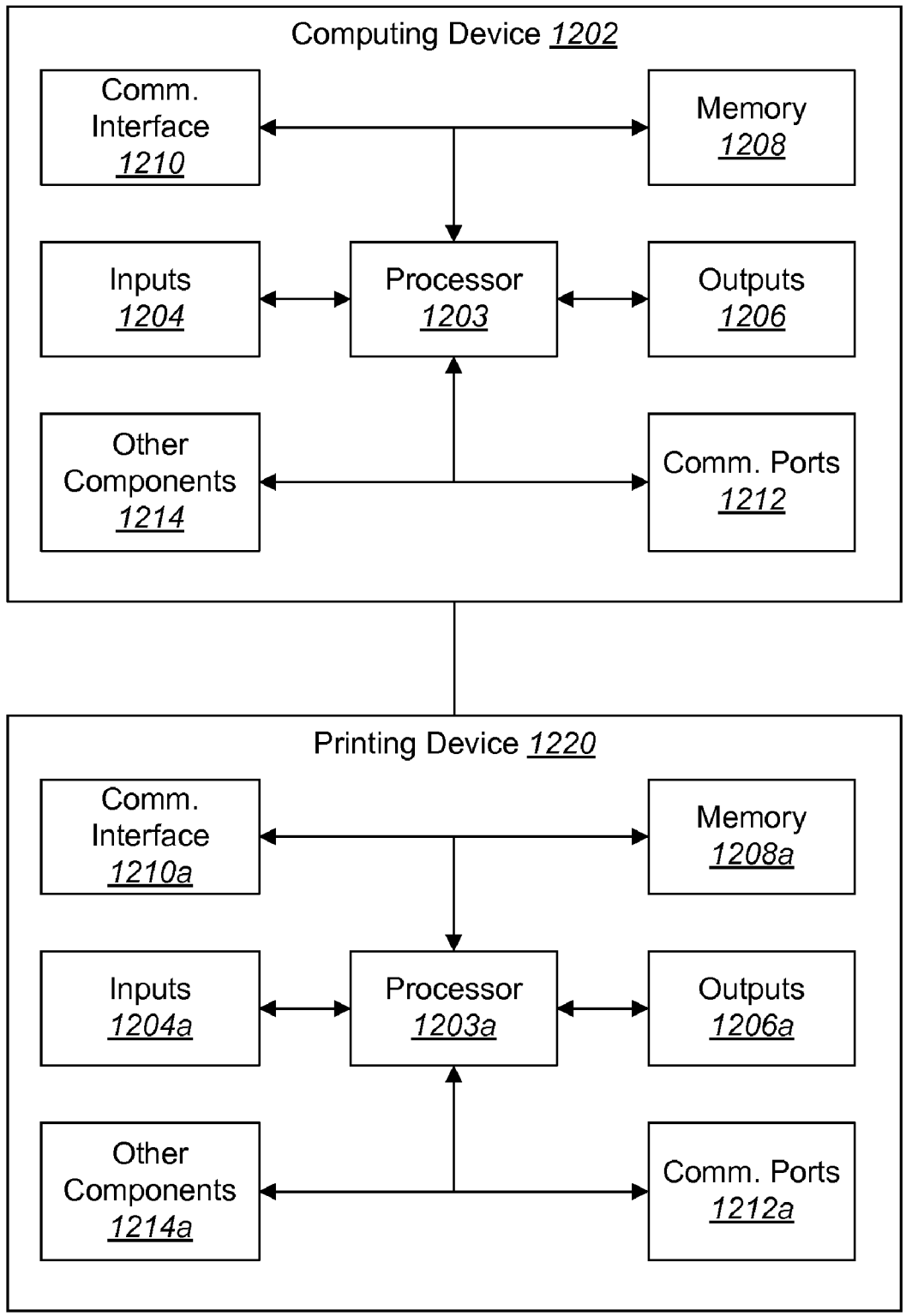
FIG. 12 is a block diagram illustrating the major hardware components typically utilized with embodiment herein.

FIG. 12 is a block diagram illustrating the major hardware components typically utilized with embodiments herein. The systems and methods disclosed may be used with a computing device 1202 and a printing device 1220. The major hardware components typically utilized in a computing device 1202 are illustrated in FIG. 12. A computing device 1202 typically includes a processor 1203 in electronic communication with input components or devices 1204 and/or output components or devices 1206. The processor 1203 is operably connected to input 1204 and/or output devices 1206 capable of electronic communication with the processor 1203, or, in other words, to devices capable of input and/or output in the form of an electrical signal. Embodiments of devices 1202 may include the inputs 1204, outputs 1206 and the processor 1203 within the same physical structure or in separate housings or structures.

The electronic device 1202 may also include memory 1208. The memory 1208 may be a separate component from the processor 1203, or it may be on-board memory 1208 included in the same part as the processor 1203. For example, microcontrollers often include a certain amount of on-board memory.

The processor 1203 is also in electronic communication with a communication interface 1210. The communication interface 1210 may be used for communications with other devices 1202, printing devices 1220, servers, etc. Thus, the communication interfaces 1210 of the various devices 1202 may be designed to communicate with each other to send signals or messages between the computing devices 1202.

The computing device 1202 may also include other communication ports 1212. In addition, other components 1214 may also be included in the electronic device 1202.

Many kinds of different devices may be used with embodiments herein. The computing device 1202 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 12 is only meant to illustrate typical components of a computing device 1202 and is not meant to limit the scope of embodiments disclosed herein.

The computing device 1202 is in electronic communication with the printing device 1220. A printing device 1220 is a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral or copier is a type of computing device. As a result, it also includes a processor, memory, communications interface, etc., as shown and illustrated in relation to FIG. 12. The printing device may be a single or a plural grouping (e.g., pool or cluster) of two or more devices.

In light of the definition of a printing device 1220 above, the term print job, as used herein, is broadly defined as any instruction or set of instructions that are sent to a printing device to cause an image to be printed, imaged, scanned, converted, sent, etc., to or from the printing device 1220. Thus, the term print job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Print jobs and printing devices are used to illustrate exemplary embodiments, but other kinds of printing jobs and printing devices may be used in implementations of the embodiments disclosed herein.

Figure 13:
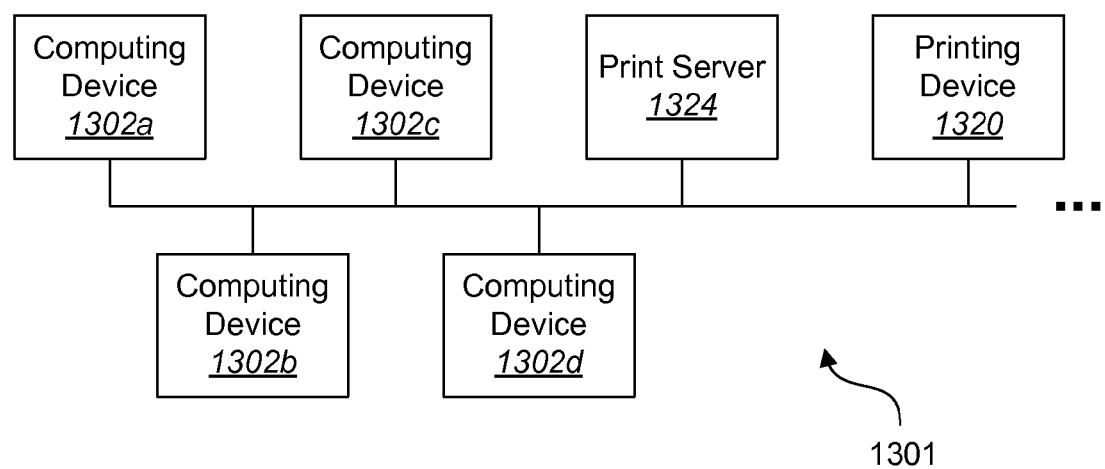
FIG. 13 is a network block diagram illustrating one possible environment in which the present systems and methods may be implemented.

FIG. 13 is a network block diagram illustrating one possible environment in which the present systems and methods may be implemented. The present systems and methods may also be implemented on a standalone computer system. FIG. 13 illustrates a computer network 1301 comprising a plurality of computing devices 1302, a printing device 1320 and a print server 1324.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for deferring a print job within a queue, the method comprising:
    receiving the print job;
    scheduling the print job for despooling to a printing device;
    analyzing print data and print settings associated with the print job, wherein the analyzing is performed by an analyzer that classifies the type of print data, and wherein the analyzer is capable of classifying unformatted document data, formatted document data, image data, vector data, page description language, and graphics language;
    performing a low parse analysis of the print data and the print settings to determine paper requirements of the print job, wherein the low parse analysis determines a total number of pages without parsing the entire data associated with the print job;
    determining availability of a paper supply associated with the printing device; and
    deferring the print job before the print job is sent to the printing device or before the print job is rasterized.

2. The method of claim 1, wherein the deferring of the print job is performed by a print spooler.

3. The method of claim 2, wherein the print spooler is external to the printing device, and wherein the print job is deferred by the external print spooler before the print job is sent to the printing device.

4. The method of claim 2, wherein the print spooler is internal to the printing device, and wherein the print job is deferred by the internal print spooler before the print job is rasterized.

5. The method of claim 1, wherein the print data is in a printer specific format.

6. The method of claim 1, wherein the print data is in a non-printer specific format.

7. The method of claim 1, further comprising sending a notification that the print job was deferred.

8. The method of claim 1, further comprising monitoring the availability of the paper supply associated with the printing device.

9. The method of claim 1, further comprising recalling the print job after deferment.

10. The method of claim 9, wherein the print job is recalled if it is determined that the paper supply associated with the printing device satisfies the paper requirements.

11. A computing device configured to defer a print job within a queue, the computing device comprising:
    a processor;
    memory in electronic communication with the processor;
    executable instructions executable by the processor, wherein the instructions are executable to:
        receive the print job;
        schedule the print job for despooling to a printing device;
        analyze print data and print settings associated with the print job, wherein the instructions to analyze comprise instructions executable to cause an analyzer to classify the type of print data, and wherein the analyzer is capable of classifying unformatted document data, formatted document data, image data, vector data, page description language, and graphics language;
        perform a low parse analysis of the print data and the print settings to determine paper requirements of the print job, wherein the low parse analysis determines a total number of pages without parsing the entire data associated with the print job;
        determine availability of a paper supply associated with the printing device; and
        defer the print job before the print job is sent to the printing device or before the print job is rasterized.

12. The computing device of claim 11, further comprising a print spooler configured to defer the print job.

13. The computing device of claim 11, wherein the print data is in a printer specific format.

14. The computing device of claim 11, wherein the print data is in a non-printer specific format.

15. A printing device configured to defer a print job within a queue, the printing device comprising:
    a processor;
    memory in electronic communication with the processor;
    executable instructions executable by the processor, wherein the instructions are executable to:
        receive the print job;
        schedule the print job for despooling to the printing device;
        analyze print data and print settings associated with the print job, wherein the instructions to analyze comprise instructions executable to cause an analyzer to classify the type of print data, and wherein the analyzer is capable of classifying unformatted document data, formatted document data, image data, vector data, page description language, and graphics language;
        perform a low parse analysis of the print data and the print settings to determine paper requirements of the print job, wherein the low parse analysis determines a total number of pages without parsing the entire data associated with the print job;
        determine availability of a paper supply associated with the printing device; and
        defer the print job before the print job is sent to the printing device or before the print job is rasterized.

16. The printing device of claim 15, wherein the instructions are further executable to recall the print job after deferment.

17. The printing device of claim 16, wherein the instructions are further executable to recall the print job if it is determined that the paper supply associated with the printing device satisfies the paper requirements.

18. A non-transitory computer-readable medium encoded with a computer program comprising executable instructions for deferring a print job within a queue, wherein the instructions are executable to:
- receive the print job;
- schedule the print job for despooling to a printing device;
- analyze print data and print settings associated with the print job, wherein the instructions to analyze comprise instructions executable to cause an analyzer to classify the type of print data, and wherein the analyzer is capable of classifying unformatted document data, formatted document data, image data, vector data, page description language, and graphics language;
- perform a low parse analysis of the print data and the print settings to determine paper requirements of the print job, wherein the low parse analysis determines a total number of pages without parsing the entire data associated with the print job;
- determine availability of a paper supply associated with the printing device; and
- defer the print job before the print job is sent to the printing device or before the print job is rasterized.

19. The non-transitory computer-readable medium of claim 18, wherein the instructions are further executable to defer the print job at a print spooler.

* * * * *